United States Patent
Park et al.

(10) Patent No.: US 7,583,465 B2
(45) Date of Patent: Sep. 1, 2009

(54) DISK DRIVE ADAPTIVE RESONANCE COMPENSATION METHOD AND APPARATUS

(75) Inventors: Cheol-hoon Park, Giheung-gu (KR); Nam-guk Kim, Anyang-si (KR); Soo-young Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 50 days.

(21) Appl. No.: 11/772,955

(22) Filed: Jul. 3, 2007

(65) Prior Publication Data

US 2008/0007861 A1    Jan. 10, 2008

(30) Foreign Application Priority Data

Jul. 5, 2006    (KR) .................. 10-2006-0062979

(51) Int. Cl.
*G11B 21/02*    (2006.01)
(52) U.S. Cl. .................. 360/75; 360/65; 360/77.02; 360/78.04
(58) Field of Classification Search .................. None
See application file for complete search history.

(56) References Cited

U.S. PATENT DOCUMENTS

| | | | | |
|---|---|---|---|---|
| 5,737,254 A | * | 4/1998 | Lane et al. | 708/320 |
| 6,417,982 B1 | * | 7/2002 | Ottesen et al. | 360/77.02 |
| 6,831,804 B2 | | 12/2004 | Ooi et al. | |
| 7,466,507 B2 | * | 12/2008 | Fulkerson et al. | 360/31 |
| 7,501,783 B2 | * | 3/2009 | Imadu et al. | 318/611 |
| 2006/0126204 A1 | * | 6/2006 | Taniguchi et al. | 360/31 |

FOREIGN PATENT DOCUMENTS

| | | |
|---|---|---|
| JP | 2002287827 | 10/2002 |
| JP | 2002287831 | 10/2002 |
| KR | 1020000047652 A | 7/2000 |
| KR | 1020040070478 A | 8/2004 |

\* cited by examiner

*Primary Examiner*—Jason C Olson
(74) *Attorney, Agent, or Firm*—Volentine & Whitt, PLLC

(57) ABSTRACT

A method used in a disk drive system for compensating a frequency component affecting servo control performance. The method includes detecting a frequency component affecting a servo control output in a disk drive/head during a manufacturing process and storing the detected frequency component in a nonvolatile memory device. A frequency component is read from a nonvolatile memory device corresponding to a selected head each time the disk drive is turned on by a user. A parameter value of a filter is determined by using a servo control circuit of the disk drive to suppress the read frequency component.

36 Claims, 11 Drawing Sheets

DISK DRIVE ADAPTIVE RESONANCE COMPENSATION METHOD AND APPARATUS

BACKGROUND OF THE INVENTION

1. Field of the Invention

The present invention relates to a servo control method and apparatus of a data storage system, and more particularly, to a method and apparatus for compensating for a frequency component affecting servo control performance in a system.

This U.S. non-provisional patent application claims priority under 35 U.S.C §119 of Korean Patent Application No. 10-2006-0062979 filed on Jul. 5, 2006, the entire contents of which are hereby incorporated by reference.

2. Discussion of Related Art

In general, a hard disk drive (HDD) is a combination of a head disk assembly (HDA) comprised of mechanical components and an electrical circuit. A harmful resonance is generated by a head stack assembly (HSA), a disk, and a motor which are components of the HDD. This resonance directly affects a Position Error Signal (PES) resulting in a decrease of stability of servo control of the HDD. The decrease of stability causes a decrease in data reliability.

Korean Patent Application No. 10-0518553 suggests a technique of detecting a resonance frequency by vibrating a system each time the system is used. The detected resonance frequency is compensated for by using a notch filter. Korean Patent Application No. 10-0377844 suggests a technique of compensating for an influence of a resonance frequency using at least one programmable filter provided in each servo loop.

Figure 8:
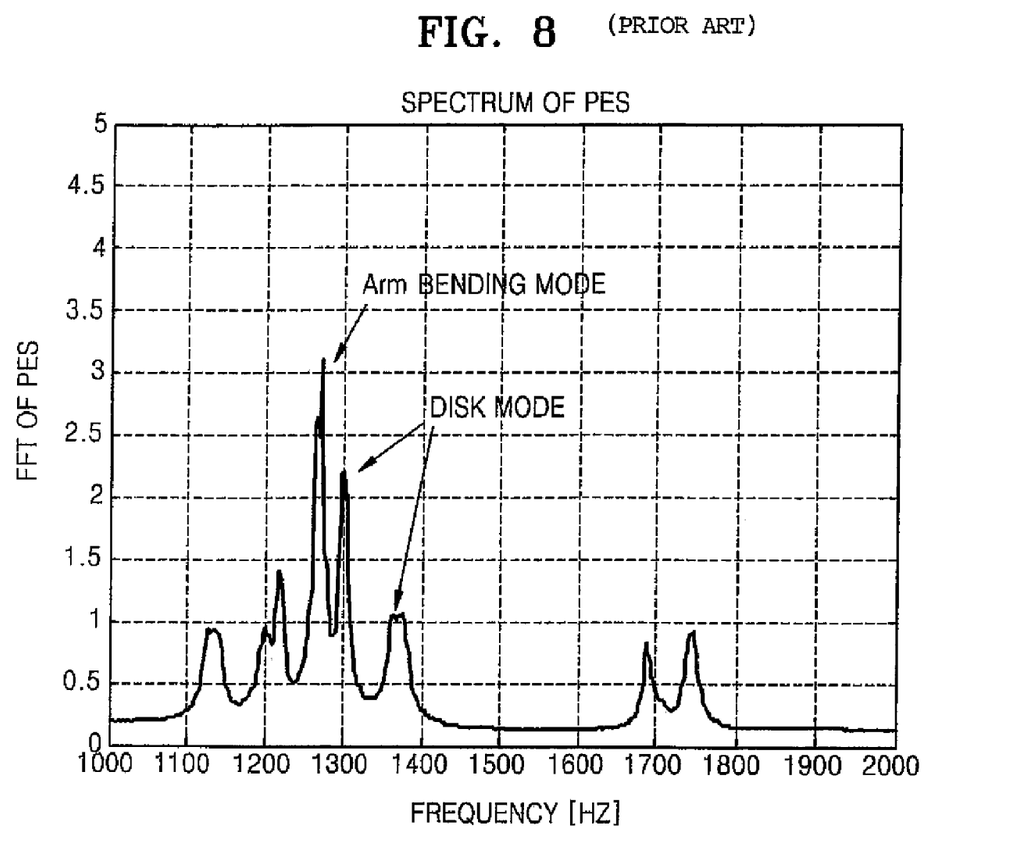
FIG. 8 is a graph showing a frequency spectrum of PES in an arm bending mode and a disk mode of an HDD.
Figure 11:
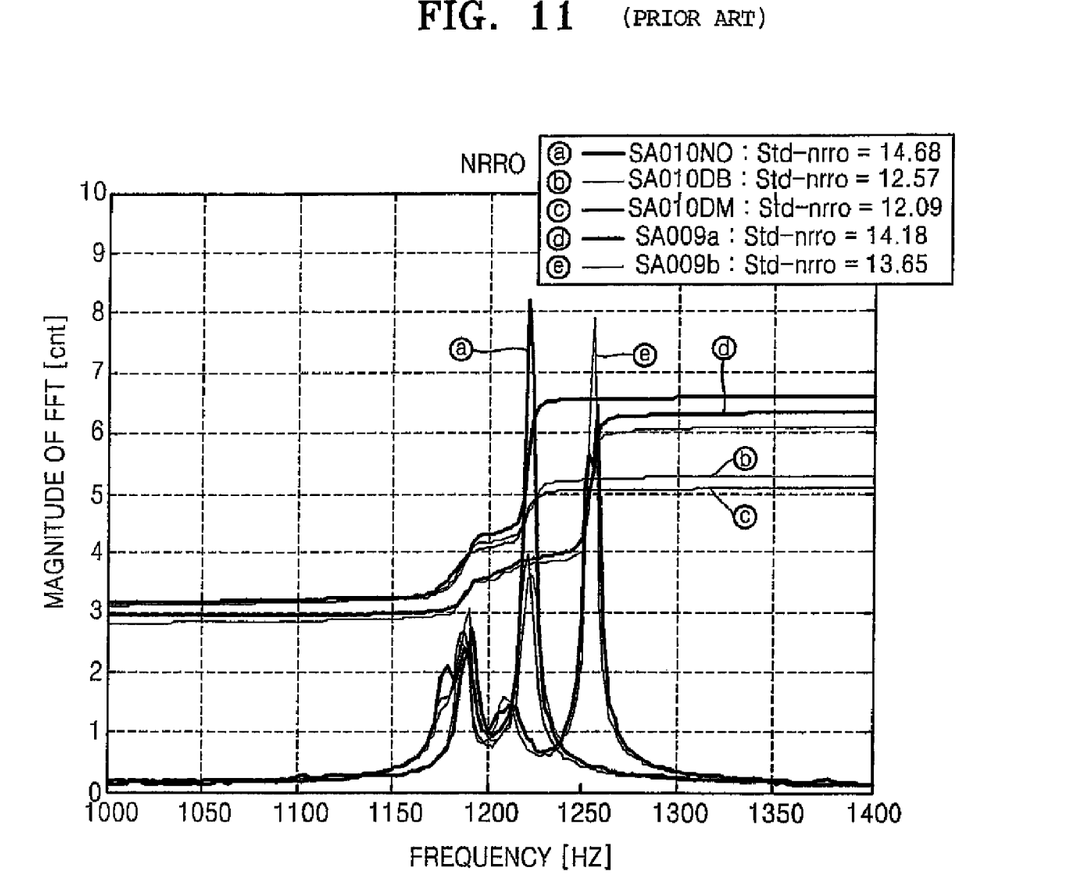
FIG. 11 is a graph showing a frequency spectrum of PES according to a change to the arm bending mode in an HDD basis.

As illustrated in FIG. 8, the PES is affected by a disk mode representing a resonance caused by a disk and an arm bending mode representing a resonance caused by an assembly state of an actuator arm. Previous methods to solve this problem removed the resonance frequency affecting the HDD by filtering or screening based on a frequency of a PES. Filters used to remove the resonance frequency are designed in an initial development stage based on a resonance frequency component extracted from PESs of a predetermined number of HDDs and commonly applied to all HDDs. However, resonance frequencies change according to characteristics of various components forming an HSA assembly, as well as the characteristics of each assembly. As illustrated in FIG. 11, a plurality of HDDs â-ê have different resonance frequencies. The resonance frequency differences between HSA assemblies having different characteristics cannot be solved by a loop filter or a notch filter using fixed filter parameters commonly applied to all HDDs.

SUMMARY OF THE INVENTION

The present invention provides an adaptive system resonance compensation method and apparatus for storing information related to a frequency component affecting servo control in a system during the manufacturing process and suppressing a harmful frequency component using the stored information. An adaptive system resonance compensation method of a hard disk drive system includes the steps of detecting a frequency component affecting a servo control output associated with a selected disk drive head during the manufacturing process. The detected frequency component is stored in a nonvolatile memory device. A frequency component corresponding to the selected head is read from the nonvolatile memory device each time the disk drive is turned on by a user. A parameter value of a filter employed in a servo control circuit of the disk drive is determined to suppress the read frequency component.

DESCRIPTION OF EMBODIMENTS

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Figure 1:
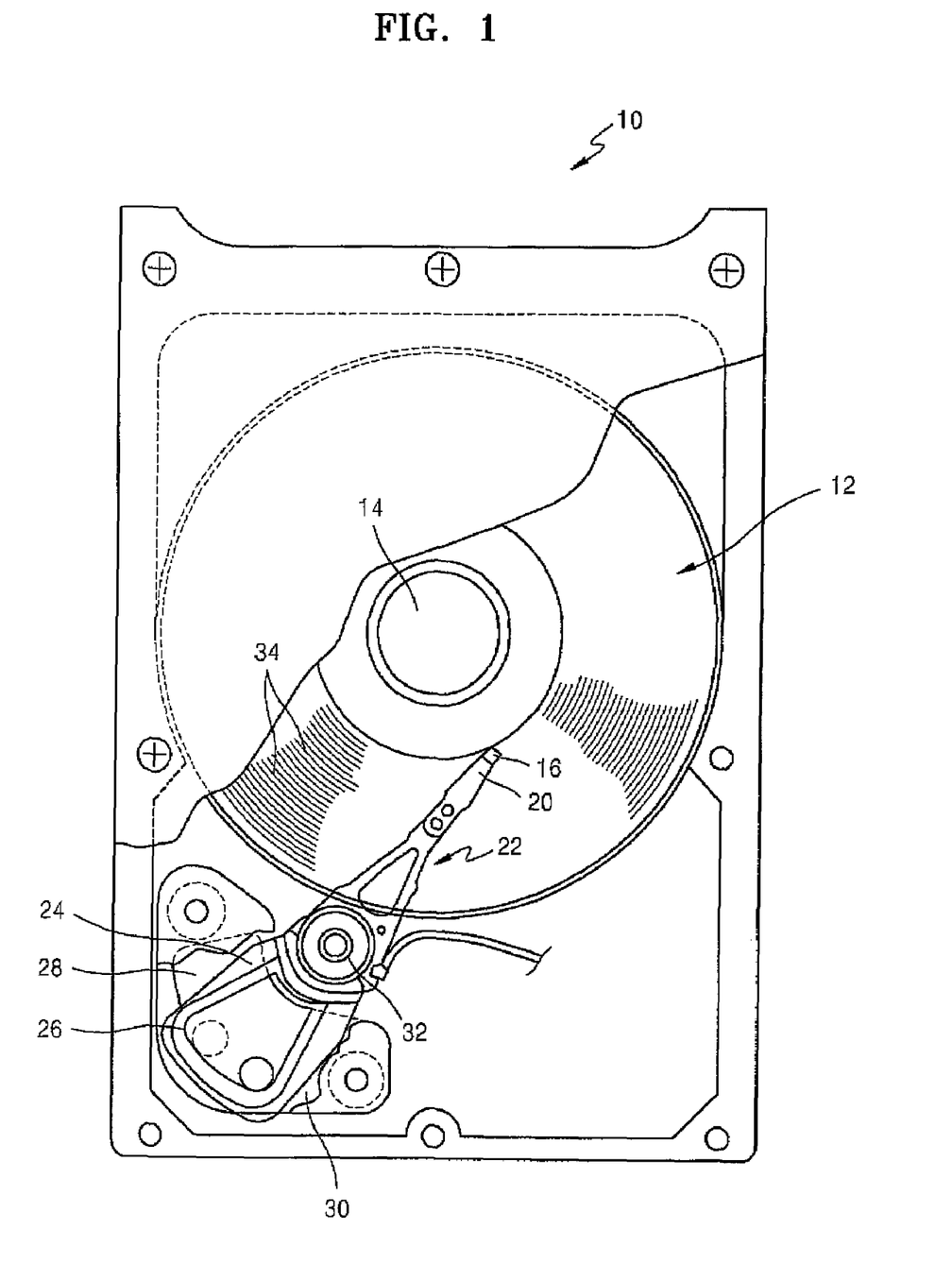
FIG. 1 is a schematic plan view of a hard disk drive (HDD) in accordance with the present invention.

FIG. 1 is a schematic plan view of a hard disk drive (HDD) 10 including at least one magnetic disk 12 rotated by a spindle motor 14 and a transducer 16 located above the surface of disk 12. Transducer 16 is configured to read information from rotating disk 12 by sensing a magnetic field on the surface of disk 12 or writing information to disk 12 by magnetizing the surface of the disk. Although a single transducer 16 is referenced, transducer 16 includes a write transducer for magnetizing disk 12 and a separate read transducer for sensing a magnetic field. The read transducer is composed of a magneto-resistive (MR) component and is commonly referred to as a head. Transducer 16 may be mounted on slider 20 which generates an air cushion between transducer 16 and the surface of disk 12. Slider 20 in combination with head gimbal assembly (HGA) 22 is attached to actuator arm 24 having a voice coil 26. Voice coil 26 is adjacent to magnetic assembly 28 to define a voice coil motor (VCM) 30. The current supplied to voice coil 26 generates a torque to rotate actuator arm 24 about bearing assembly 32. The rotation of actuator arm 24 forces transducer 16 to move across the surface of disk 12. Information is typically stored in concentric tracks of disk 12 where each track 34 includes a plurality of sectors. Each sector includes a data field and an identification field that includes gray code used to identify a disk sector and a disk track (cylinder).

Figure 2:
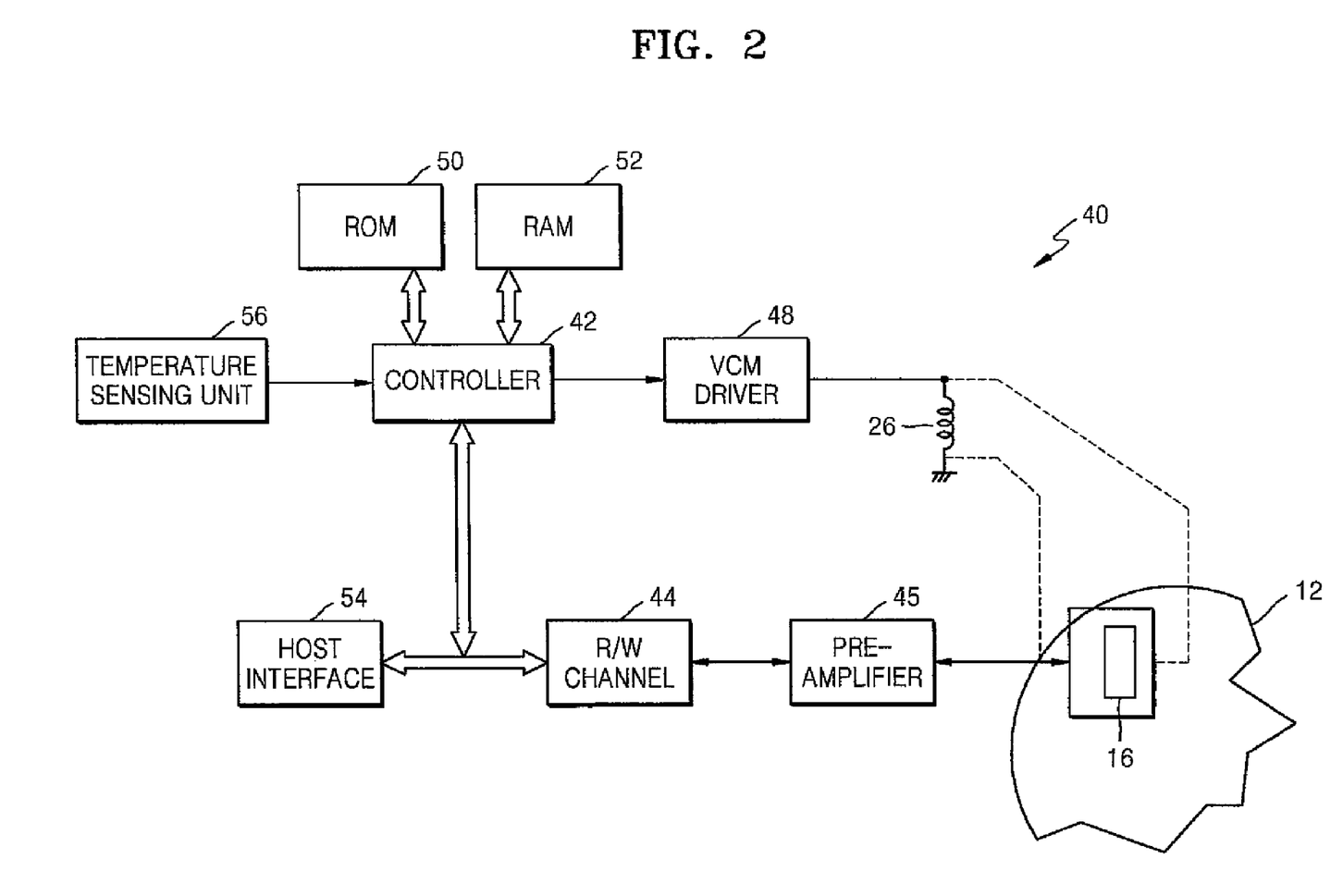
FIG. 2 is a block diagram of an electrical system of the HDD illustrated in FIG. 1.

FIG. 2 is a block diagram illustrating an electrical system 40 of HDD 10 that includes controller 42, read/write (R/W) channel 44, pre-amplifier 45, VCM driver 48, Read Only Memory (ROM) 50, Random Access Memory (RAM) 52, host interface 54, and temperature sensing unit 56. The temperature sensing unit 56 measures an internal temperature of HDD 10 and may be implemented, for example, using a thermistor. ROM 50 stores various instructions and data used by controller 42 to execute software routines including programs for executing the adaptive system resonance compensation methods illustrated in FIGS. 4-7. In particular, ROM 50 stores a frequency component associated with the position control of head 16. This stored frequency component was measured on a drive/head basis during the disk drive manufacturing process. In addition, a filter parameter value calculated to suppress the frequency component measured in the manufacturing process is also stored in ROM 50. Alternatively, the frequency component and filter parameter value may be stored in a maintenance cylinder (M/C) area of disk 12. RAM 52 stores information read from ROM 50 or disk 12 needed to drive HDD 10. RAM 52 is also configured to store data generated during the execution of the adaptive system resonance compensation method The controller 42 analyzes a command received from a host device (not shown) via host interface 54. Controller 42 provides a control signal to VCM driver 48 to control excitation of VCM 30 or movement of head 16.

During a read mode, HDD 10 amplifies an electrical signal sensed from disk 12 by the read component of head 16 using pre-amplifier 45 based on a fixed gain value. R/W channel 44 performs automatic gain control, converts the signal read from disk 12 to a digital signal according to a sector pulse generated by controller 42 and decodes the converted digital signal. The decoded data is processed for error-correction by controller 42, converted to stream data, and transmitted to the host device via host interface 54.

During a write mode, HDD 10 receives data from the host device via host interface 54. An error correction parity symbol is added to the received data in controller 42. The error correction parity symbol is encoded to be suitable for a write channel using R/W channel 44. The encoded data is written to disk 12 through a write component of head 16 using a write current amplified by pre-amplifier 45 when a sector pulse is generated.

Figure 3:
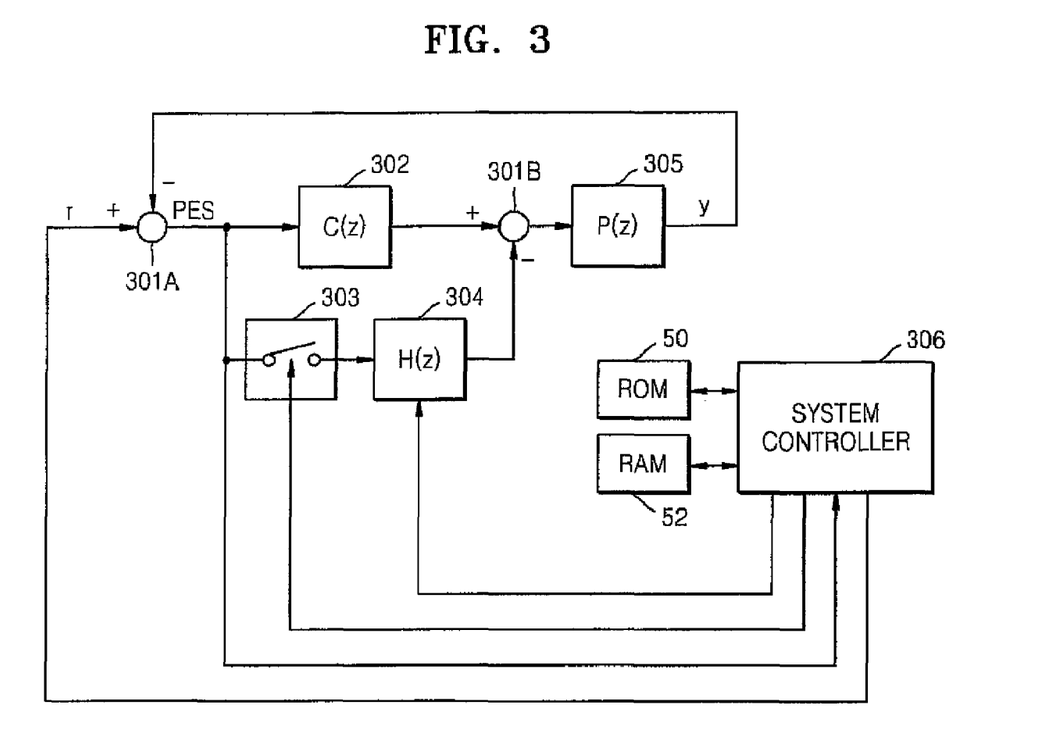
FIG. 3 is a block diagram of a servo control system to which an adaptive system resonance compensation apparatus in accordance with an embodiment of the present invention.

FIG. 3 is a block diagram of a servo control system that includes subtracters 301A and 301B, a servo controller 302, a switch 303, a loop filter 304, a VCM driver/actuator 305, a system controller 306, ROM 50, and RAM 52. Servo controller 302 and system controller 306 are included in controller 42 shown with reference to FIG. 2. Loop filter 304 is a variable filter having a frequency characteristic associated with a parameter value determined by system controller 306. The frequency component affecting servo control appears in a PES used for controlling the position of head 16.

During the disk drive manufacturing process a burn-in test process or a normal temperature test process may be used. In order to detect the frequency component affecting servo control performance in a drive/head basis, system controller 306 controls switch 303 to an open position. As a result, loop filter 304 is disabled. Servo controller 302 then generates a servo control signal for controlling VCM 30 to place head 16 on the center of a target track using the PES in an ON-TRACK mode. The PES is generated by a servo signal corresponding to the position of head 16 above disk 12. This signal is obtained by subtracting a servo output signal y of VCM driver/actuator 305 from a reference voltage r output from system controller 306. Thus, the PES corresponds to an output signal of subtracter 301A. Subtracter 301B subtracts an output signal of loop filter 304 from the servo control signal generated by servo controller 302 and outputs the result to VCM driver/actuator 305. Because loop filter 304 is disabled due to the opening of switch 303, servo control signal generated by servo controller 302 is input to VCM driver/actuator 305 without subtraction. In this manner, VCM driver/actuator 305 drives VCM 30 by generating a driving current corresponding to the servo control signal to control the movement of head 16. VCM driver/actuator 305 generates the servo output signal y using the servo signal according to the movement of head 16. Subtracter 301A then generates a PES by subtracting the servo output signal y from the reference voltage r.

A harmful resonance frequency is generated by a head stack assembly (HSA), disk 12, and various motors of HDD 10 directly reflected on the PES. As described above, system controller 306 measures PESs of a plurality of tracks in a disable state of loop filter 304 in the ON-TRACK mode with respect to each head 16 of HDD 10 and stores the measured PESs in RAM 52. System controller 306 reads the PESs of each head 16 stored in RAM 52 and performs Fast Fourier Transform (FFT) of the read PESs. If removal of a resonance frequency is required using loop filter 304 in a specific resonance mode, the FFT may be performed for only a specific frequency range considering part deviations. System controller 306 detects a frequency component having the maximum magnitude in a desired frequency range from the FFT-transformed PESs of each head 16. The frequency component detected in the head is stored in ROM 50 or the maintenance cylinder (M/C) area of the disk 12.

Alternatively, system controller 306 calculates a parameter of loop filter 304 to suppress the frequency component detected in the head and stores the parameter value calculated in the head in ROM 50 or the M/C area of disk 12. For example, when loop filter 304 is designed as a second-order band pass filter, loop filter 304 has a frequency characteristic represented by Equation 1:

$$H_{bp}(z) = K \frac{z^2 - 1}{z^2 - (2\gamma \cos \omega_c) z + \gamma^2} \quad (1)$$

where $\omega_c$ denotes a center frequency, $\gamma$ denotes a pass bandwidth, and K denotes a gain in the center frequency. The values of $\gamma$ and K are fixed and $\omega_c$ is a frequency component affecting HDD 10 corresponding to each head 16 which is detected by system controller 306. Thus, only a parameter related to the center frequency is changed among parameters of loop filter 304 and the values of $\gamma$ and K may be changed.

In this manner, the frequency component affecting the PES or the parameter value of filter 304 to suppress the frequency component in a drive/head basis associated with the manufacturing process is stored in ROM 50 or an M/C area of disk 12.

Figure 9:
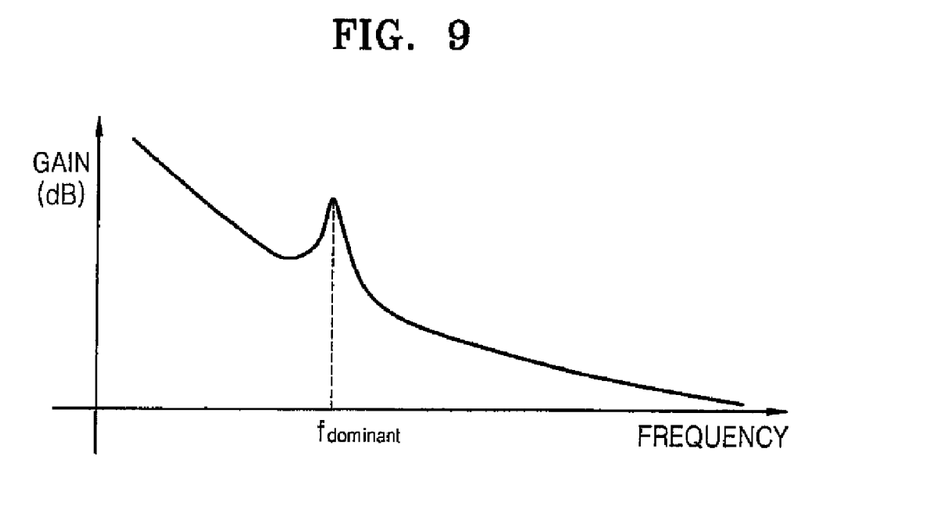
FIG. 9 is a graph showing an open loop response characteristic of a servo control system in a state where a loop filter illustrated in FIG. 3 is enabled in accordance with an embodiment of the present invention.

In operation, system controller 306 closes switch 303. Each time HDD 10 is turned on, system controller 306 reads a frequency component corresponding to a currently selected head 16 stored in ROM 50 or the M/C area of disk 12. System controller 306 calculates a parameter value of loop filter 304 to suppress the read frequency component. In other words, system controller 306 calculates a parameter value so that the read frequency component is the center frequency of loop filter 304. System controller 306 updates a currently set parameter value of loop filter 304 to the calculated parameter value. Thus, if the frequency component corresponding to the selected head 16 is $f_{dominant}$, an open loop response in a state where loop filter 304 is enabled in the servo control system shown in FIG. 3 is represented by the frequency/gain curve of FIG. 9 If the loop filter 304 is enabled due to the closing of switch 303, subtracter 301B subtracts an output signal of loop filter 304 from the servo control signal generated by servo controller 302 and outputs the result to VCM driver/actuator 305. Thus, the subtracter 301B outputs a servo control signal in which the frequency component $f_{dominant}$ affecting the servo control is attenuated.

Figure 12:
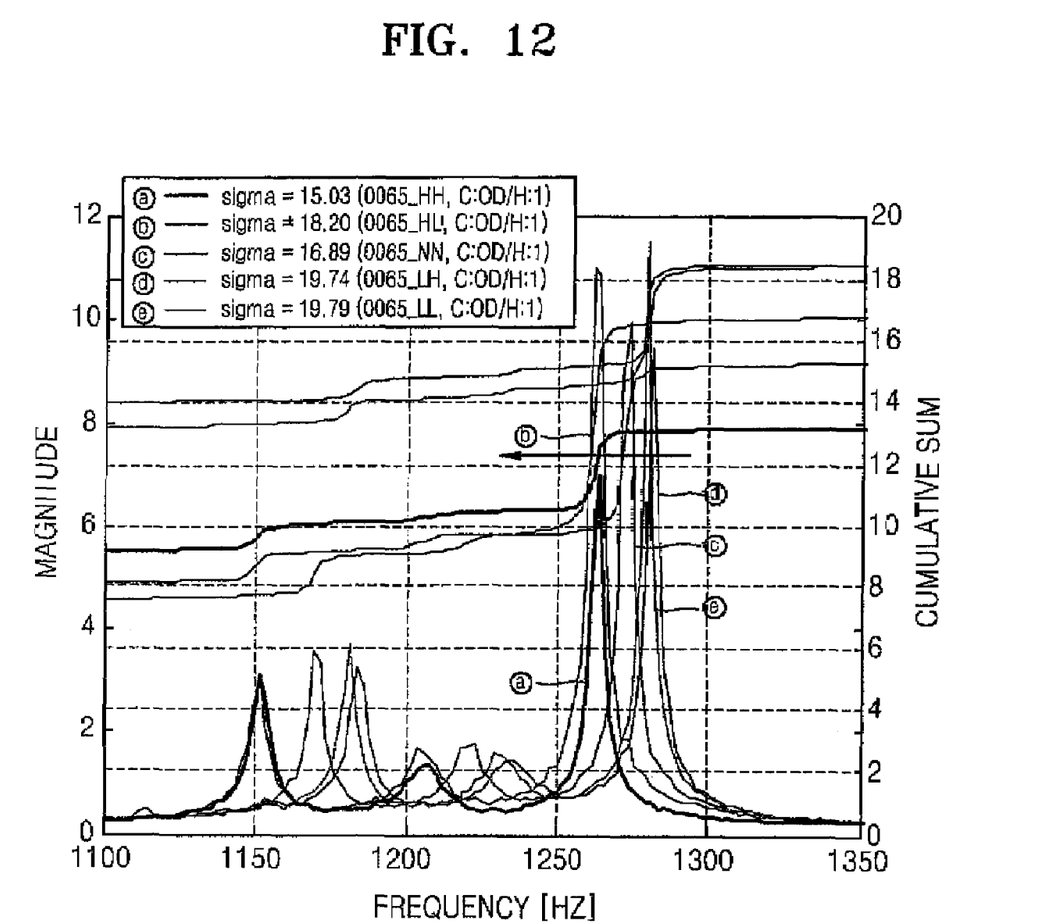
FIG. 12 is a graph showing a frequency spectrum of PES, which shows a resonance frequency movement according to a change of an operational temperature in an HDD in accordance with an embodiment of the present invention.

In general, if the operational temperature of HDD 10 is changed, rigidity of actuator arm 24 also changes resulting in a change of the resonance frequency. FIG. 12 is a graph showing that a resonance frequency moves in the direction of the arrow according to an increase in temperature of a plurality of HDDs a-e. Thus, a resonance frequency deviation characteristic according to a temperature change can be detected. In addition, the frequency component affecting the servo control performance, detected under normal temperature conditions, can be adjusted according to the operational temperature of HDD 10 sensed by temperature sensing unit 56 using the resonance frequency deviation characteristic. Moreover, system controller 306 may adjust the frequency component affecting the servo control of the currently selected head 16. Controller 306 determines the resonance frequency deviation characteristic according to a temperature change in HDD 10, calculates a parameter value based on the adjusted frequency component, and updates a parameter for determining the center frequency of loop filter 304 to the calculated parameter value. In this manner, the servo control performance can be increased by suppressing the frequency component affecting servo control.

In another embodiment of the present invention, system controller 306 reads a filter parameter value for suppressing a frequency component affecting the servo control of a currently selected head 16, which is stored in the ROM 50 or the M/C area of the disk 12, every time HDD 10 is turned on by a user. System controller 306 then updates a currently set parameter value of loop filter 304 to the read parameter value. The center frequency of loop filter 304 is the same as a frequency component affecting the servo control performance of selected head 16. If loop filter 304 is enabled due to the closing of switch 303, subtracter 301B outputs a servo control signal in which the frequency component affecting the servo control of the selected head 16 is attenuated. In addition, system controller 306 can adjust the parameter value to suppress the frequency component affecting the servo control of selected head 16. Controller 306 considers the resonance frequency deviation characteristic according to a temperature change in HDD 10 and updates a parameter for determining the center frequency of loop filter 304 to the adjusted parameter value. Thus, the servo control performance can be increased by suppressing the frequency component affecting the servo control. Although a loop filter is used for removing a resonance frequency affecting a servo control performance in an HDD, a notch filter may also be used to remove the resonance frequency.

Figure 4:
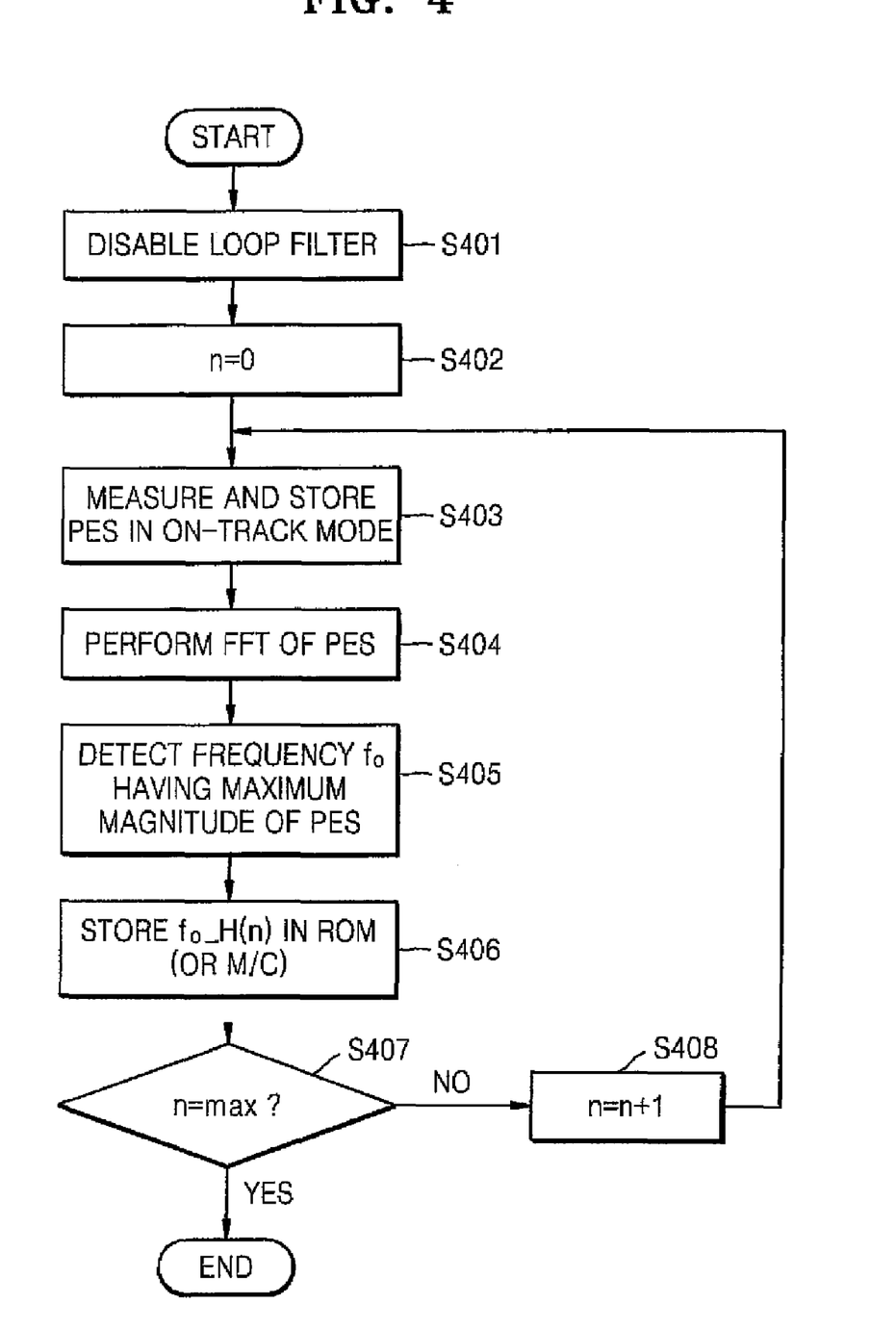
FIG. 4 is a flowchart illustrating an adaptive system resonance compensation method performed in a manufacturing process in accordance with an embodiment of the present invention.

FIG. 4 is a flowchart illustrating an adaptive system resonance compensation method performed in the manufacturing process where loop filter 304, which was added to suppress a resonance frequency in a servo control system, is disabled in step S401. A counter n (not shown, but which may be embedded in system controller 306), used to determine which of the heads 16 is selected, is reset to 0 in step S402. After the selected head 16 is moved to a specific track to be tested, a PES is measured in the ON-TRACK mode in which the selected head 16 follows the center of the specific track and is stored in RAM 52 at step S403. When n=0, the selected head 16 is head 0 (H(0)). The PES stored in the RAM 52 is read and FFT transformed in step S404 where the FFT operation converts the value in the time domain to a value in the frequency domain. A frequency component $f_0$ having the maximum PES in a desired frequency area is detected from the FFT result in step S405. A frequency component $f_0\_H(n)$ detected for each head H(n), in step S405 is stored in ROM 50 or the M/C area of disk 12 in step S406. Step S407 determines whether a value of the counter n is equal to the maximum value (max) where the maximum value is a number corresponding to the last head number of HDD 10. If it is determined in step S407 that the value of counter n is not equal to the maximum value, the last head of HDD 10 has not been examined and the value of counter n is increased by 1 in step S408. This process is fed back to step S403 in order to perform steps S403-S406 after increasing the head number an increment of 1. If the value of the counter n is equal to the maximum value max as determined in step S407 the last head has been examined and the process terminates.

Figure 5:
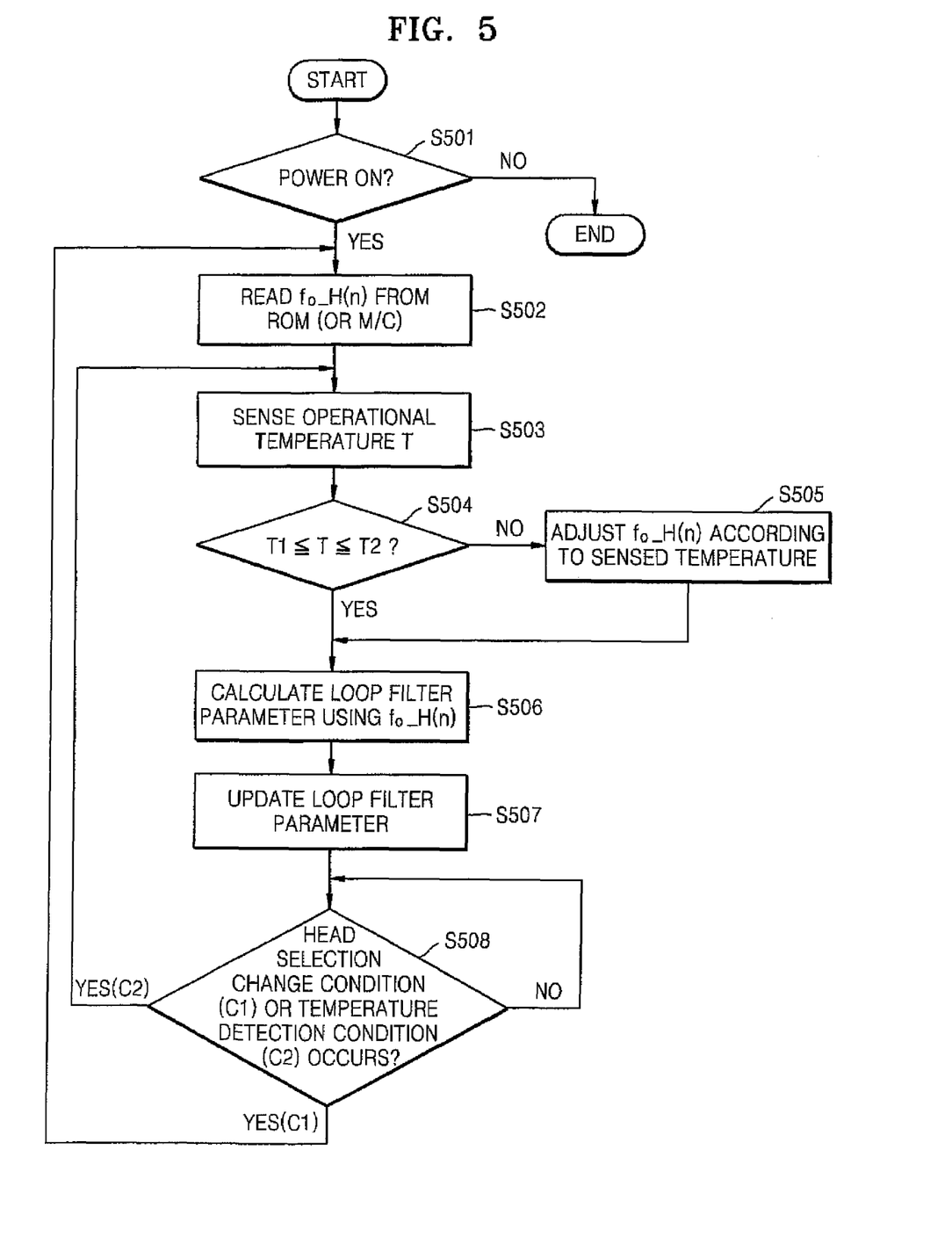
FIG. 5 is a flowchart illustrating an adaptive system resonance compensation method performed in a user environment in accordance with an embodiment of the present invention.

FIG. 5 is a flowchart illustrating an adaptive system resonance compensation method of the present invention performed in the user environment. Step S501 determines whether HDD 10 is turned on. If HDD 10 is turned on, information associated with a frequency component $f_0\_H(n)$ of a currently selected head 16 stored in ROM 50 or the M/C area of the disk 12 read in step S502. An operational temperature T of HDD 10 is sensed using temperature sensing unit 56 included in HDD 10 in step S503. Step S504 determines whether the operational temperature T sensed in step S503 satisfies a normal temperature condition range (T1≦T≦T2). The normal temperature condition range is determined considering a resonance frequency deviation characteristic according to a temperature change in HDD 10. If it is determined that the operational temperature T satisfies the normal temperature condition range (T1≦T≦T2), a loop filter parameter value is calculated in step S506 so that the frequency component $f_0\_H(n)$ of the currently selected head 16 is the center frequency of loop filter 304. If it is determined in step S504 that the operational temperature T does not satisfy the normal temperature condition range (T1≦T≦T2), a value of the frequency component $f_0\_H(n)$ of the currently selected head 16 is adjusted in step S505 considering the resonance frequency deviation characteristic according to a temperature change in HDD 10. For example, the value of frequency component $f_0\_H(n)$ can be adjusted using a lookup table in which various center frequencies according to the relevant temperature change is set. The frequency component $f_0\_H(n)$ according to the operational temperature T can also be adjusted using a function in which a resonance frequency variation ratio of HDD 10 according to the temperature change is previously approximated.

When the value of the frequency component $f_0\_H(n)$ is adjusted in step S505 according to the operational temperature T, a loop filter parameter value is calculated in step S506 based on the adjusted value of the frequency component $f_0\_H(n)$. In step S507, a parameter value of loop filter 304 is updated to the parameter value calculated in step S506. Thus, the center frequency of the loop filter 304 most closely matches a frequency affecting position control of the currently selected head 16 in the operational temperature T of HDD 10. Accordingly, a resonance frequency corresponding to a center frequency component of loop filter 304 is suppressed by the servo control system illustrated in FIG. 3.

Step S508 determines whether a condition C1 in which the head 16 selected in HDD 10 is changed or a temperature detection condition C2 occurs. For example, the temperature detection condition C2 can be set as a condition entering to an idle mode. If it is determined in step S508 that condition C1 exists, this process is fed back to step S502. If it is determined in step S508 that the temperature detection condition C2 exists, the process is fed back to step S503. HDD 10 may be designed not to consider the operational temperature T, whereby steps S503-S505 are omitted.

Figure 6:
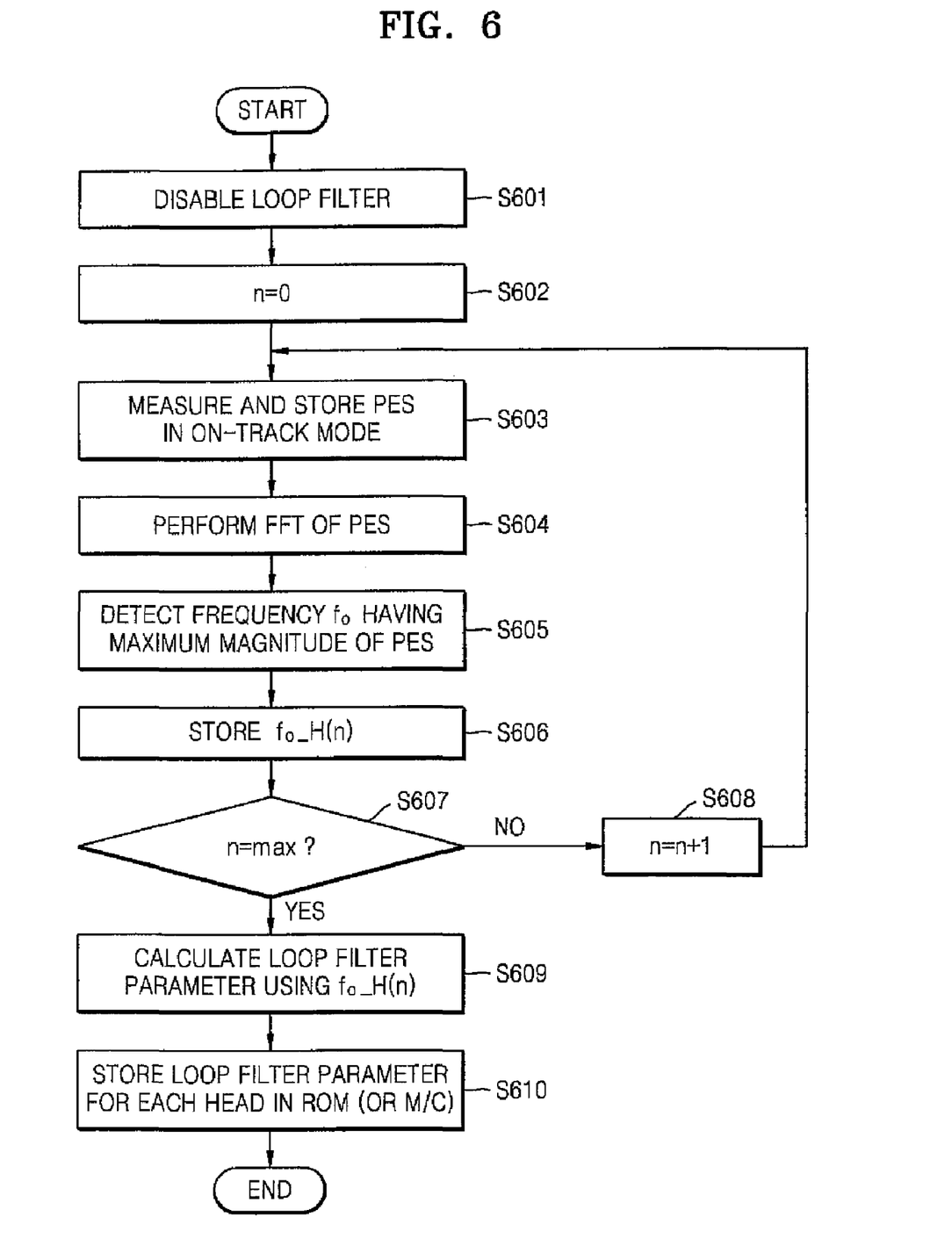
FIG. 6 is a flowchart illustrating an adaptive system resonance compensation method performed in a manufacturing process in accordance with an embodiment of the present invention.

FIG. 6 is a flowchart illustrating an adaptive system resonance compensation method performed in the manufacturing process where loop filter 304, added to suppress a resonance frequency in a servo control system, is disabled in step S601. A counter n (not shown, but which may be embedded in system controller 306) is used to determine whether a selected head 16 is reset to 0 in step S602. After the selected head 16 is moved to a specific track to be tested, a PES is measured in the ON-TRACK mode in which the selected head 16 follows the center of the specific track and is stored in RAM 52 in step S603. When n=0, the selected head 16 is identified as head 0 (H(0)). Generally, it is advantageous to measure PESs of a plurality of tracks. The PES stored in RAM 52 is read and FFT transformed in operation S604 where the FFT operations converts the value of a time domain to a value in the frequency domain. In step S605, a frequency component $f_0$ having the maximum PES in a desired frequency area is detected from the FFT result. A frequency component $f_0\_H(n)$ detected for each head H(n) in operation S605 is stored in RAM 52 in step S606. Step S607 determines whether a value of counter n is equal to the maximum value max where the maximum value is a number corresponding to the last head of HDD 10. If it is determined in step S607 that the value of counter n is not equal to the maximum value max, the last head has not been examined and the value of counter n is increased by 1 in step S608. This process is fed back to perform steps S603-S606 after increasing the header number by an increment of 1. If it is determined in step S607 that the value of counter n is equal to the maximum value (max), the last head has been examined. In step S609, the frequency component $f_0\_H(n)$ is detected for each head H(n) and stored in RAM 52. The frequency component is read and a loop filter parameter value for each head H(n) is calculated so that the frequency component $f_0\_H(n)$ detected for each head H(n) is the center frequency of loop filter 304. In step S610, the loop filter parameter value for each head H(n) calculated in operation S609 is stored in ROM 50 or the M/C area of disk 12.

Figure 7:
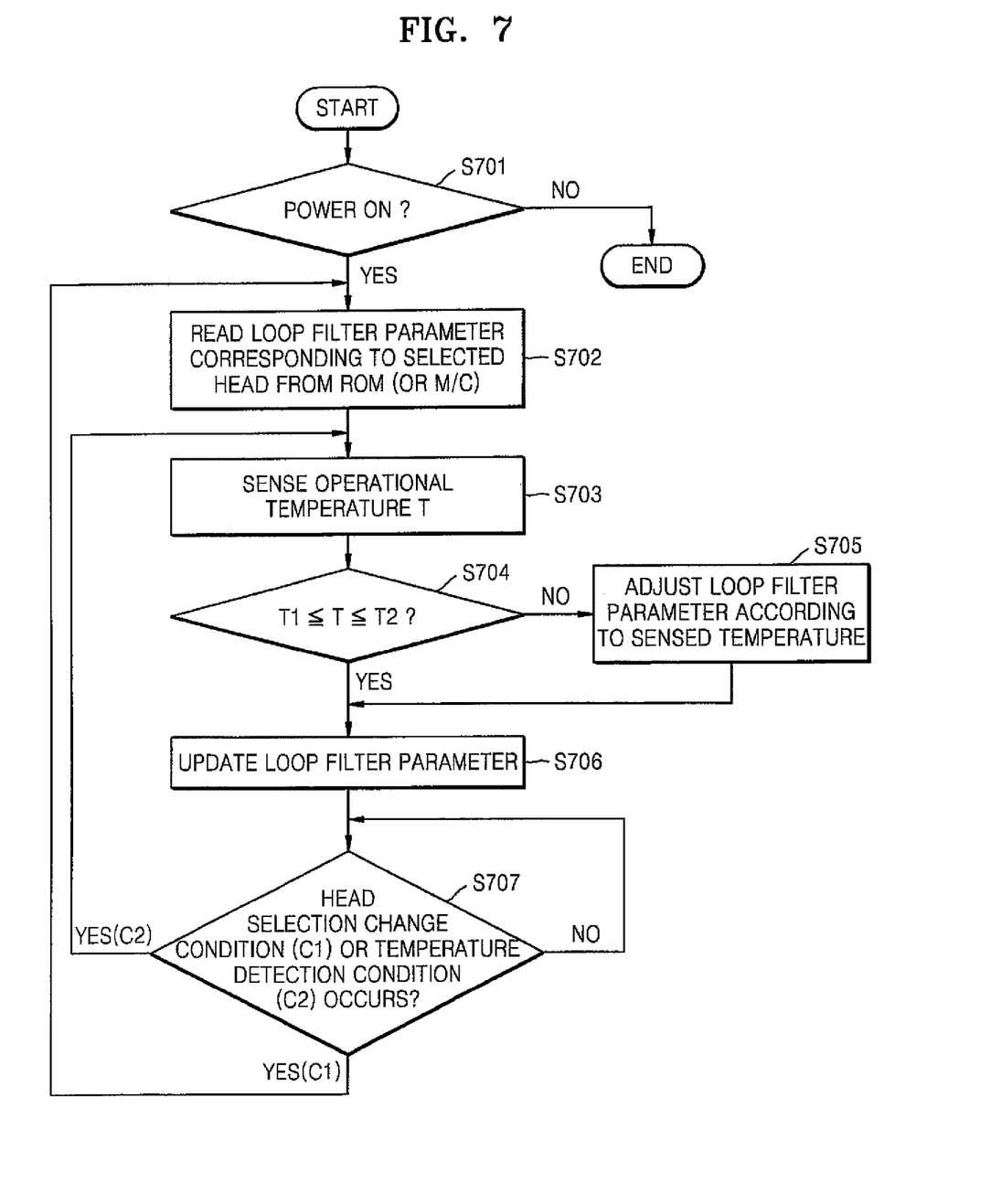
FIG. 7 is a flowchart illustrating an adaptive system resonance compensation method in accordance with an embodiment of the present invention.

FIG. 7 is a flowchart illustrating an adaptive system resonance compensation method of the present invention performed in the user environment. Step S701 determines whether HDD 10 is turned on. If HDD 10 is turned on, information on a loop filter parameter value corresponding to a currently selected head 16, which is stored in ROM 50 or the M/C area of disk 12 from the process illustrated in FIG. 6, is read in step S702. An operational temperature T of HDD 10 is sensed using the temperature sensing unit 56 included in HDD 10 at step S703. Step S704 determines whether the operational temperature T sensed in step S703 satisfies a normal temperature condition range ($T1 \leq T \leq T2$). The normal temperature condition range is determined considering a resonance frequency deviation characteristic according to a temperature change in HDD 10. If step S704 determines that the operational temperature T is within the normal temperature condition range ($T1 \leq T \leq T2$), a loop filter parameter value is updated in step S706 to the parameter value read in step S702. If the the operational temperature T is not within the normal temperature condition range ($T1 \leq T \leq T2$) from step S704, the loop filter parameter value corresponding to the currently selected head 16 is adjusted in step S705 considering the resonance frequency deviation characteristic according to a temperature change in HDD 10. For example, the loop filter parameter value can be adjusted according to the operational temperature T of HDD 10 using a lookup table in which adjusted loop filter parameter values are set considering a center frequency variation according to a temperature change. When the loop filter parameter value is adjusted in step S705 according to the operational temperature T, a loop filter parameter value is updated to the adjusted parameter value in step S706. Thus, the center frequency of loop filter 304 most closely matches a frequency affecting position control of the selected head 16 in the operational temperature T of HDD 10. Accordingly, a resonance frequency corresponding to a center frequency component of loop filter 304 is suppressed by the servo control system illustrated in FIG. 3. Step S707 determines whether a condition C1 in which the selected head 16 in HDD 10 is changed or a temperature detection condition C2 occurs. For example, the temperature detection condition C2 can be set as a condition entering the idle mode. If it is determined in step S707 that the condition C1 exists, the process is fed back to step S702. If step S707 determines that the temperature detection condition C2 exists, the process is fed back to steps S703. HDD 10 may also be designed not to consider the operational temperature T whereby steps S703-S705 are omitted. Using the above-described method, servo control performance can be improved by determining the center frequency of loop filter 304 to suppress a frequency component affecting a PES in the disk drive/head associated with an operational temperature.

Figure 10:
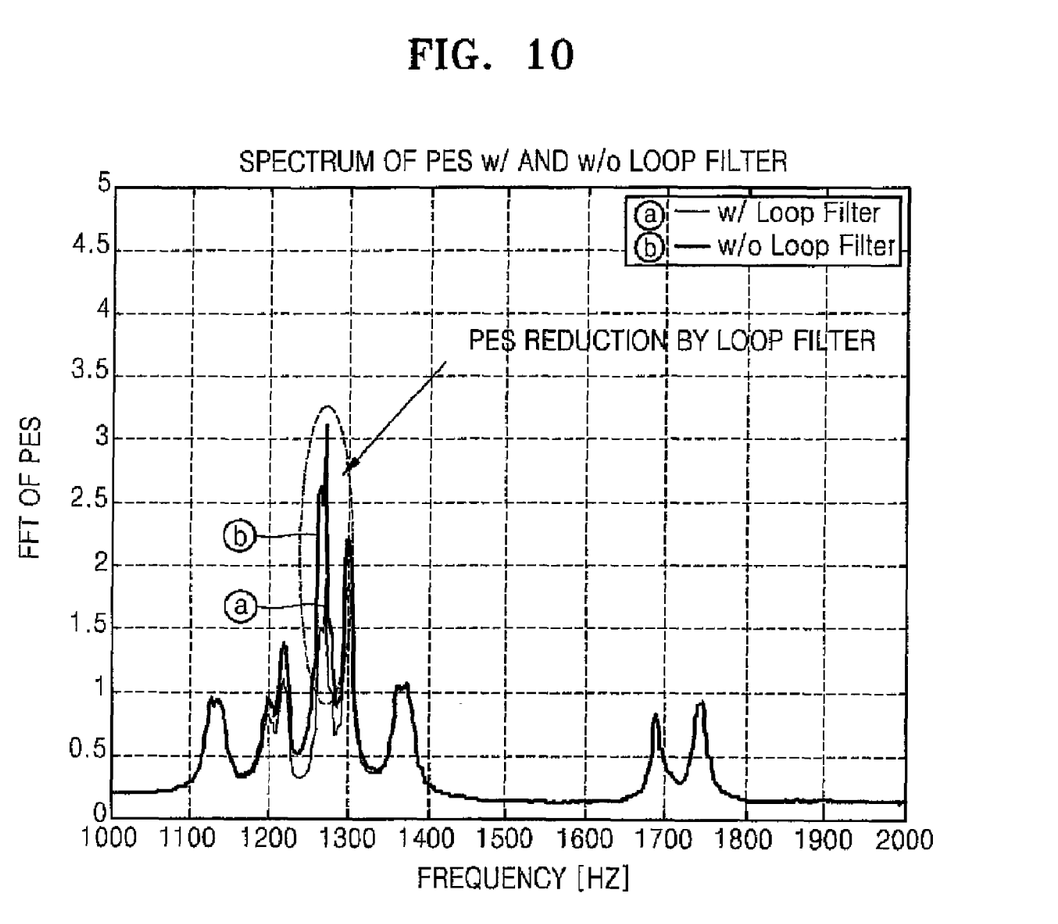
FIG. 10 is a graph showing a frequency spectrum of PES according to an ON/OFF condition of the loop filter illustrated in FIG. 3 in accordance with an embodiment of the present invention.

FIG. 10 illustrates improvement of the magnitude of a PES through the use of loop filter 304. In particular, the magnitude of a PES in frequency area ɓ employed before the use of loop filter 304 is improved to the PES in frequency area â after the use of loop filter 304 by determining a parameter using the adaptive system resonance compensation method in accordance with the present invention.

The invention described herein may be implemented as a method, an apparatus, or a system. In particular, when implemented using software, its component elements are code segments that execute necessary operations. Programs or code segments can be stored in processor readable media and can be transmitted via a computer data signal that is combined with a carrier wave in a transmission medium or in a communication network. The processor readable medium can be any medium that can store or transmit data. Examples of processor readable medium include electronic circuits, semiconductor memory devices, ROMs, flash memories, erasable ROMs (EROMs), floppy disks, optical disks, hard disks, optical fibers, radio frequency (RF) networks, etc. The computer date signal can be any signal that is transmitted via transmission media, such as electronic network channels, optical fiber, air, RF networks, etc.

Although the present invention has been described in connection with the embodiment of the present invention illustrated in the accompanying drawings, it is not limited thereto. It will be apparent to those skilled in the art that various substitutions, modifications and changes may be made thereto without departing from the scope and spirit of the invention.

What is claimed is:

1. An adaptive system resonance compensation method of a hard disk drive system comprising:
    (a) detecting a frequency component affecting a servo control output associated with a selected disk drive head during the manufacturing of said disk drive;
    (b) storing the detected frequency component in a nonvolatile memory device;
    (c) reading a frequency component corresponding to said selected head from said nonvolatile memory device each time said disk drive is turned on by a user; and
    (d) determining a parameter value of a filter employed in a servo control circuit of said disk drive to suppress said read frequency component.

2. The adaptive system resonance compensation method of claim 1, wherein said manufacturing process comprises a burn-in test process.

3. The adaptive system resonance compensation method of claim 1, wherein the nonvolatile memory device further comprises a Read Only Memory (ROM) of said disk drive.

4. The adaptive system resonance compensation method of claim 1, wherein the nonvolatile memory device further comprises a maintenance cylinder area of a disk.

5. The adaptive system resonance compensation method of claim 1, wherein said filter further comprises a loop filter connected in parallel to a servo controller of said disk drive, said controller configured to generate a signal to control said disk drive, said signal obtained by subtracting an output signal of said loop filter from a control signal output from said servo controller.

6. The adaptive system resonance compensation method of claim 1, wherein detecting a frequency component further comprises:
    detecting a Position Error Signal (PES) in an ON-TRACK mode associated with a state when said filter is disabled for each head of said disk drive;
    transforming said detected PES for each head using Fast Fourier Transform (FFT); and
    detecting a frequency component having a maximum magnitude of the FFT-transformed PES.

7. The adaptive system resonance compensation method of claim 1, wherein storing the detected frequency component further comprises:
    reading a frequency component corresponding to a currently selected head from said nonvolatile memory device each time said disk drive is turned on in said user environment;
    calculating a parameter value of said filter to determine said frequency component as a center frequency of said filter; and
    updating a parameter value for determining the center frequency of said filter to the calculated parameter value.

8. The adaptive system resonance compensation method of claim 1, wherein storing the detected frequency component further comprises:
    reading a frequency component corresponding to a currently selected head from said nonvolatile memory device each time said disk drive is turned on by a user;
    sensing an operational temperature of said disk drive;
    adjusting the frequency component read from said nonvolatile memory device according to a sensed operational temperature of said disk drive based on a resonance frequency deviation characteristic of said disk drive according to a temperature change;
    calculating a parameter value of said filter to determine the adjusted frequency component as a center frequency of said filter; and
    updating a parameter value for determining the center frequency of said filter to the calculated parameter value.

9. The adaptive system resonance compensation method of claim 8, wherein adjusting the frequency component further comprises adjusting the frequency component according to the operational temperature based on a value from a lookup table that contains center frequency variation information associated with a particular temperature.

10. The adaptive system resonance compensation method of claim 8, wherein adjusting the frequency component further comprises adjusting the frequency component according to the operational temperature of said disk drive using a function having a resonance frequency variation ratio according to a previously approximated temperature change.

11. An adaptive system resonance compensation method comprising:
    detecting a frequency component affecting a servo control output in a disk drive/head during the manufacturing of a disk drive;
    calculating a first parameter value to determine a center frequency of a filter used for servo control so as to suppress the detected frequency component and storing said calculated parameter value in a nonvolatile memory device; and
    reading a second parameter value corresponding to a currently selected mode from said nonvolatile memory device every time said disk drive is turned on by a user and updating said second parameter value to determine said center frequency of said filter using the second parameter value.

12. The adaptive system resonance compensation method of claim 11, wherein the manufacturing process comprises a burn-in test process.

13. The adaptive system resonance compensation method of claim 11, wherein the nonvolatile memory device further comprises a Read Only Memory (ROM) of said disk drive.

14. The adaptive system resonance compensation method of claim 11, wherein the nonvolatile memory device further comprises a maintenance cylinder area of said disk.

15. The adaptive system resonance compensation method of claim 11, wherein detecting a frequency component further comprises:
    detecting a Position Error Signal (PES) in an ON-TRACK mode associated with a state when said filter is disabled for each head of said disk drive;
    transforming the detected PES for each head using a Fast Fourier Transform (FFT); and
    detecting a frequency component having a maximum magnitude of the FFT-transformed PES.

16. The adaptive system resonance compensation method of claim 11, wherein reading a second parameter value further comprises:
    reading a third parameter value from said nonvolatile memory device corresponding to a selected head each time said disk drive is turned on by a user; and updating said third parameter value to determine said center frequency of said filter.

17. The adaptive system resonance compensation method of claim 11, wherein reading a second parameter value comprises:

reading a third parameter value corresponding to a selected head from said nonvolatile memory device each time said disk drive is turned on by a user;

sensing an operational temperature of said disk drive;

adjusting said third parameter value according to the sensed operational temperature considering a resonance frequency deviation characteristic in said disk drive according to a temperature change;

updating a parameter value for determining the center frequency of said filter to the adjusted third parameter value.

18. The adaptive system resonance compensation method of claim 17, wherein adjusting said third parameter further comprises adjusting a frequency component according to said operational temperature using a lookup table in which center frequency variation information associated with a particular temperature is stored.

19. An adaptive system resonance compensation apparatus used in a hard disk drive comprising:

a servo control circuit performing servo control having a filter configured to compensate for a specific frequency component;

a storage device for storing a frequency component affecting said servo control, said frequency component measured according to a mode selected during manufacturing of said disk drive; and a system controller reading a frequency component corresponding to a currently selected mode from said storage device each time said system is turned on by a user, said system controller configured to calculate a parameter value of said filter to suppress the read frequency component, said controller updating the parameter value of said filter to said calculated parameter value.

20. The adaptive system resonance compensation apparatus of claim 19, wherein said system controller adjusts the frequency component read from said storage device associated with a resonance frequency deviation characteristic in said system according to a temperature change, said controller further configured to calculate a parameter value of said filter to suppress the adjusted frequency component, said controller updating a parameter value of said filter to the calculated parameter value.

21. An adaptive system resonance compensation apparatus comprising:

a servo control circuit controlling the position of an object to be controlled including a filter used to compensate for a specific frequency component;

a storage device storing a parameter value of said filter calculated to suppress a frequency component affecting said position control, said parameter value measured according to a mode selected in a system during manufacturing of a disk drive; and a system controller reading a parameter value corresponding to a currently selected mode from said storage device each time the system is turned on by a user, said controller updating the parameter value of said filter to the read parameter value.

22. The adaptive system resonance compensation apparatus of claim 21, wherein said system controller adjusts the parameter value read from said storage device based on a resonance frequency deviation characteristic in said system according to a temperature change, said controller configured to update a parameter value of said filter to the adjusted parameter value.

23. The adaptive system resonance compensation apparatus of claim 19 wherein the parameter comprises a parameter for determining a center frequency of the filter.

24. The adaptive system resonance compensation apparatus of claim 21 wherein the parameter comprises a parameter for determining a center frequency of the filter.

25. A disk drive comprising:

at least one disk;

at least one head positioned above said disk, said head configured to write or read information to or from the at least one disk;

a servo controller controlling a position of said at least one head using a servo signal read from said head;

a filter amplifying a frequency component corresponding to a parameter value to an initially set gain associated with said disk drive, said filter connected in parallel to an input terminal of said servo controller;

a circuit for subtracting an output signal of said filter from a control signal output from the servo controller;

an actuator moving said head using an output signal from said subtracter circuit;

a storage device for storing a frequency component affecting a position control of said head measured according to a head selected in a manufacturing process; and a system controller reading a frequency component from said storage device corresponding to a selected head each time said disk drive is turned on by a user, said controller calculating a parameter value of said filter to suppress the read frequency component, said controller updating the parameter value of said filter to the calculated parameter value.

26. The disk drive of claim 25, wherein the system controller adjusts the frequency component read from said storage device associated with a resonance frequency deviation characteristic in said system according to a temperature change, said controller further calculating a parameter value of said filter to suppress the adjusted frequency component, said controller configured to update a parameter value of said filter to the calculated parameter value.

27. The disk drive of claim 25, wherein the system controller updates the parameter value each time the selected head is changed.

28. A disk drive comprising:

at least one disk;

at least one head configured to write or read information to or from the at least one disk;

a servo controller controlling a position of said at least one head using a servo signal read from said head;

a loop filter amplifying a frequency component corresponding to a parameter value to initially set a gain of said disk drive, said filter connected in parallel to an input terminal of said servo controller;

a subtracter for subtracting an output signal of said filter from a control signal output from the servo controller;

an actuator moving said head using an output signal of the subtracter;

a storage device storing a parameter value of said loop filter to suppress a frequency component affecting an output from said servo controller measured during a manufacturing process of said disk drive; and a system controller reading a parameter value corresponding to a selected head from the storage device each time the disk drive is turned on by a user, said controller updating the parameter value of said filter to the read parameter value.

29. The disk drive of claim 25, wherein the parameter comprises a parameter for determining a center frequency of the loop filter.

30. The disk drive of claim 28, wherein the parameter comprises a parameter for determining a center frequency of the loop filter.

31. The disk drive of claim 28, wherein said system controller adjusts the parameter value read from said storage device considering a resonance frequency deviation characteristic in the system according to a temperature change, said controller updating a parameter value of said loop filter to the adjusted parameter value.

32. The disk drive of claim 28, wherein the system controller performs a control process in which the parameter value is updated each time the selected head is changed.

33. The disk drive of claim 25, wherein the storage device comprises a Read Only Memory (ROM).

34. The disk drive of claim 28, wherein the storage device comprises a Read Only Memory (ROM).

35. The disk drive of claim 25, wherein the storage device comprises a maintenance cylinder area of said disk.

36. The disk drive of claim 28, wherein the storage device comprises a maintenance cylinder area of said disk.

* * * * *